United States Patent
Boyle et al.

(10) Patent No.: US 7,908,207 B2
(45) Date of Patent: **\*Mar. 15, 2011**

(54) INTERACTIVE DEMAND MANAGEMENT

(75) Inventors: Edward J. Boyle, Montclair, NJ (US); Tom Levine, Alpharetta, GA (US); Pat Corbett, Spring, TX (US); John M. Berkley, Evanston, IL (US); Linda Birbara, New York, NY (US); Richard Hand, Katy, TX (US); Dale Contratto, Scottsdale, AZ (US); Michael Gonzales, Houston, TX (US)

(73) Assignee: American Express Travel Related Services Company, Inc., New York, NY (US)

( * ) Notice: Subject to any disclaimer, the term of this patent is extended or adjusted under 35 U.S.C. 154(b) by 129 days.

This patent is subject to a terminal disclaimer.

(21) Appl. No.: 12/251,364

(22) Filed: Oct. 14, 2008

(65) Prior Publication Data

US 2009/0037233 A1 Feb. 5, 2009

Related U.S. Application Data

(63) Continuation of application No. 09/827,031, filed on Apr. 5, 2001, now Pat. No. 7,440,918.

(60) Provisional application No. 60/194,611, filed on Apr. 5, 2000.

(51) Int. Cl.
*G06Q 40/00* (2006.01)
(52) U.S. Cl. .................. 705/37; 705/35; 705/36; 705/38
(58) Field of Classification Search ............... 705/35–38
See application file for complete search history.

(56) References Cited

U.S. PATENT DOCUMENTS

| 4,799,156 A | 1/1989 | Shavit et al. |
|---|---|---|
| 4,885,685 A | 12/1989 | Wolfberg et al. |
| 5,253,165 A | 10/1993 | Leiseca et al. |
| 5,297,031 A | 3/1994 | Gutterman et al. |
| 5,642,279 A | 6/1997 | Bloomberg et al. |
| 5,758,328 A | 5/1998 | Giovannoli |
| 5,794,207 A | 8/1998 | Walker et al. |
| 5,794,219 A | 8/1998 | Brown |
| 5,797,127 A | 8/1998 | Walker et al. |

(Continued)

OTHER PUBLICATIONS

Bid4Vacations.com Recruits Two Seasoned Travel Industry Veterans As New Directors, PR Newswire. New York: Mar. 29, 2000. p. 1.*

(Continued)

*Primary Examiner* — Hani Kazimi
*Assistant Examiner* — Clement B Graham
(74) *Attorney, Agent, or Firm* — Snell & Wilmer L.L.P.

(57) ABSTRACT

A system and method is disclosed which allows the aggregation of the demands of various buyers, providing an incentive for suppliers to bid to supply those demands in an auction. The system and method operates by scanning a database which contains a listing of goods or services sought by various people or entities. Thereafter, similar goods or services are grouped together and presented to various vendors. The vendors are given the opportunity to bid on the group of similar goods or services. Such a bid may vary from the originally purchased goods or services as long as the bid is within a predetermined range. The vendor which presents the optimum bid within a predetermined period of time is selected as the provider of the goods or services and proceeds to supply the goods or services at the bid upon amount.

19 Claims, 2 Drawing Sheets

U.S. PATENT DOCUMENTS

| | | | |
|---|---|---|---|
| 5,852,808 | A | 12/1998 | Cherny |
| 5,884,274 | A | 3/1999 | Walker et al. |
| 5,897,620 | A | 4/1999 | Walker et al. |
| 5,948,040 | A * | 9/1999 | DeLorme et al. ............. 701/201 |
| 6,021,397 | A * | 2/2000 | Jones et al. ................. 705/36 R |
| 6,023,679 | A | 2/2000 | Acebo et al. |
| 6,023,685 | A | 2/2000 | Brett et al. |
| 6,041,308 | A | 3/2000 | Walker et al. |
| 6,058,379 | A | 5/2000 | Odom et al. |
| 6,067,532 | A | 5/2000 | Gebb |
| 6,085,169 | A | 7/2000 | Walker |
| 6,098,051 | A | 8/2000 | Lupien et al. |
| 6,101,484 | A | 8/2000 | Halbert et al. |
| 6,107,932 | A | 8/2000 | Walker et al. |
| 6,108,639 | A | 8/2000 | Walker |
| 6,112,185 | A | 8/2000 | Walker et al. |
| 6,134,534 | A | 10/2000 | Walker et al. |
| 6,199,099 | B1 | 3/2001 | Gershman et al. |
| 6,240,396 | B1 | 5/2001 | Walker et al. |
| 6,311,178 | B1 | 10/2001 | Bi et al. |
| 6,584,451 | B1 * | 6/2003 | Shoham et al. ................. 705/37 |
| 2001/0042785 | A1 * | 11/2001 | Walker et al. ................. 235/379 |
| 2004/0117302 | A1 * | 6/2004 | Weichert et al. ............... 705/40 |

OTHER PUBLICATIONS

Tessler, J. On-Line Auction House OnSale Inc. Expanding Beyond Computer Sales Dow Jones Online News Mar. 27, 1998, see entire document.

Anonymous Virgin Holidays and Internet Liquidators Put Travel Packages on the Internet Auction Block—Bid.com to Deliver Super Savings to Canadians on Last-Minute Travel Packages Can. Corp. news Jun. 18, 1998, see entire document.

Anonymous Travel Depot of Boston Announces Travel Desk 2000 Bus. Wire Jan. 9, 2001, see entire document.

Destination information systems Design issues and directions Hong-Mei Chen, Pauline J. Sheldon. Journal of Management Information Systems, Armonk: Fall 1997. vol. 14, Iss. 2; p. 151, 2 pgs).

Non-Final Rejection dated Jun. 23, 2005 in U.S. Appl. No. 09/827,031 by Timothy M. Harbeck.

Final Rejection dated Sep. 22, 2005 in U.S. Appl. No. 09/827,031 by Timothy M. Harbeck.

Advisory Action dated Nov. 22, 2005 in U.S. Appl. No. 09/827,031 by Timothy M. Harbeck.

Non-Final Rejection dated Jan. 27, 2006 in U.S. Appl. No. 09/827,031 by Timothy M. Harbeck.

Final Rejection dated Jul. 11, 2006 in U.S. Appl. No. 09/827,031 by Timothy M. Harbeck.

Advisory Action dated Sep. 26, 2006 in U.S. Appl. No. 09/827,031 by Timothy M. Harbeck.

Non-Final Rejection dated Dec. 12, 2006 in U.S. Appl. No. 09/827,031 by Timothy M. Harbeck.

Final Rejection dated May 15, 2007 in U.S. Appl. No. 09/827,031 by Timothy M. Harbeck.

Advisory Action dated Jul. 24, 2007 in U.S. Appl. No. 09/827,031 by Timothy M. Harbeck.

Non-Final Rejection dated Nov. 2, 2007 in U.S. Appl. No. 09/827,031 by Clement B. Graham.

Notice of Allowance dated Aug. 11, 2008 in U.S. Appl. No. 09/827,031 by Clement B. Graham.

US 6,047,266, 04/2000, Van Horn et al. (withdrawn)

* cited by examiner

INTERACTIVE DEMAND MANAGEMENT

CROSS-REFERENCE TO RELATED APPLICATIONS

This application is a continuation of and claims priority to, and the benefit of, U.S. Ser. No. 09/827,031, filed Apr. 5, 2001 and entitled "INTERACTIVE DEMAND MANAGEMENT"; which itself claims priority to, and claims the benefit of, U.S. Provisional Application Ser. No. 60/194,611, filed Apr. 5, 2000, both of which are hereby incorporated by reference.

FIELD OF INVENTION

The present invention relates to demand aggregation, and more particularly, to a method and system for conducting a reverse auction using an interactive demand management system.

BACKGROUND OF THE INVENTION

In the past, it has been difficult for purchasers to leverage the buying power of several unrelated entities in an attempt to get preferred terms from suppliers. For example, people who wish to travel are often forced to purchase airline tickets at a rate determined by the airline, with little room to negotiate a better rate. People traveling for recreational purposes may have more room to negotiate or find a better deal because their plans may not be as structured as those of a business traveler. But business travelers often have less flexibility as to the time of a trip, giving suppliers leverage over them and little incentive to lower prices. Organizations (such as corporations) which spend large amounts of money on travel have an advantage as they may be able to leverage their high volume and obtain a volume discount. However, such an option is often not available to smaller organizations. For example, organizations with large travel expenditures, e.g., more than $10 million per year, are able to obtain discounts of 15 to 40%, while small-medium enterprises lack the clout to secure such discounts.

Current systems which attempt to optimize travelling costs may utilize a travel manager overseeing one corporation to potentially notice a group (or "lot") of travelers with similar demand—e.g., each member of the lot may be preparing to attend the same conference. If the travel manager is made aware of this fact before reservations are made, the travel manager may be able to contact suppliers to negotiate a group discount. Such group discount negotiations can occur across multiple corporations such as when a conference/show organizer negotiates show rates at convention hotels. "Pre-trip" software also exists that is used by travel managers to determine where savings opportunities exist. However, this typically involves catching somebody traveling "out-of-policy" before the person actually travels. It can also involve organizing a group and then ad-hoc negotiating a special fare/rate or discovering a group of key executives on the same flight and rebooking some to de-risk the accident exposure.

In industries where buyers are fragmented and suppliers are both consolidated and well-invested in yield management systems, auctions represent an opportunity to aggregate demand and create price-makers out of price-takers. In other words, the pricing of goods and services could be more influenced by the users rather than solely determined by the suppliers. With regard to travel in the business context, however, small to medium size companies have difficulty in aggregating demand for several reasons. For example, because of the relatively small number of travelers from small organizations planning a particular trip, those businesses have less leverage in negotiations than the relatively few number of carriers, which may be unwilling to negotiate contracts across unrelated companies.

In certain industries, on web sites such as mercata.com, suppliers bid on contracts to provide goods or services to others. However, due to the low volume and the lack of aggregation in the travel industry, it has been difficult for the system to adapt to the travel industry and other industries. Mercata.com used another model that achieved much initial success. The model contained a "PowerBuy" system in which the unit price of an item would become lower when more users expressed interest in the item. This model also relied on pre-negotiated pricing to result in lowered prices for consumers and is thus not a true auction.

Moreover, the field of auctions on the Internet has evolved rapidly in the past few years. For example, Priceline.com uses a model where users bid a certain amount for an airline ticket, and various airlines can accept the bid. While this system appears to be a true auction, it typically operates through the use of pre-negotiated inventory discounts: the system scans a list of pre-negotiated prices and determines if the requested price has been matched.

Mobshop.com expanded upon the model of Mercata.com by aggregating across multiple affiliate sites. For example, a typical organization may purchase many computer monitors in a year, however, the purchasing may occur over a variety of different divisions of the organization: whereas each of 10 sites could include 100 buyers, together they represent a single "lot" of 1000 buyers.

FreeMarkets utilized an "open cry" reverse auction to drive pricing down among multiple competing suppliers of a given product or service. The typical pre-negotiation present in the FreeMarket system is whether a supplier will participate. In other words, prices bid by suppliers are determined in "real-time." However, FreeMarkets only allows negotiations on price alone; the other terms for the provision of the goods or services are not negotiable.

However, with the low volume and the lack of aggregation, the above-described systems are difficult to adapt to the travel industry and other similar industries. Furthermore, the key to forcing suppliers to negotiate with consumers is to have a large number of products or services available for bidding at one time by suppliers. Such a situation is not sufficiently present in the travel industry, thus, individual travelers may not have the ability to negotiate. Therefore, there is a need for a method and system to aggregate demand in certain fields.

SUMMARY OF THE INVENTION

The present method scans a database which contains a listing of goods or services sought by various people or entities. Thereafter, similar goods and services are grouped together and presented to various vendors. The vendors are given the opportunity to bid on the entire group of similar goods or services. The vendor bid may vary from the originally purchased goods or services as long as the bid is within a predetermined range. The vendor which presents the optimum bid within a predetermined period of time is selected as the provider of the goods or services and proceeds to supply the goods or services at the bid amount.

BRIEF DESCRIPTION OF THE DRAWINGS

The invention is further described in connection with the accompanying drawings, where like reference numbers depict like elements, in which.

DETAILED DESCRIPTION

Figure 1:
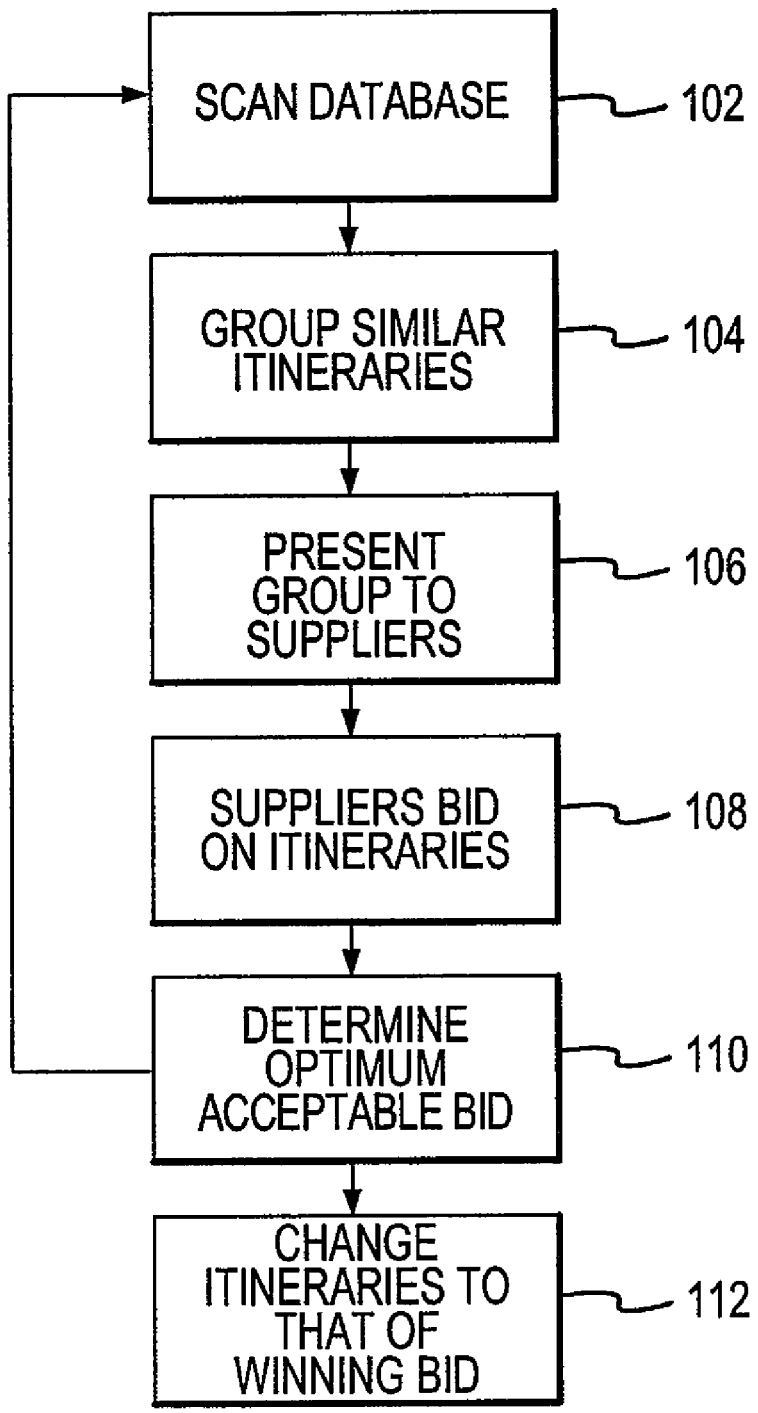
FIG. 1 depicts a flowchart illustrating the operation of an embodiment of the present invention.

An exemplary embodiment of the present invention includes a system which contains a database of travel arrangements. The databases of existing systems, also known as Computer Reservation Systems ("CRS") or Global Distribution Systems ("GDS"), in which travel arrangements are stored may be used in this context. For example, companies such as Sabre, Galileo, Amadeus, and Worldspan each run a GDS. Other databases, such as those used by travel agencies with a World Wide Web presence such as Microsoft's Expedia site or Sabre's Travelocity site, may also be accessed by an embodiment of the present invention. All of the foregoing known systems are hereby incorporated by reference.

The database typically consists of a number of different fields which are formatted to contain specific information. The rows or records contain a memorialization of a reservation, with information in each of the fields. For example, a field in the database may be titled DATE_DEPARTURE and may contain information regarding the departure date of each row in the database. A row in the database would indicate each of the particulars of a reservation, for example, the name of the traveler, a contact method, the departure time and place, and the arrival time and place. Each row corresponds to a Passenger Name Record ("PNR") in the database.

When travel arrangements are made, the system that receives the traveler's orders may be configured such that the flights are reserved by the system. However, a ticket need not be issued until a predetermined time before the flight activity. In a typical situation, a traveler may make a reservation or travel request for a flight, but not have the flight "ticketed." Thus, the airline would have to reserve a seat on the particular flight for the passenger. However, the price for the seat may be changed and the traveler may also have the ability to cancel or change the reservation, within a particular time period.

Moreover, in an exemplary embodiment, an itinerary in the system may be associated with a set of rules that should be followed, if the flight is to be changed. For example, a traveler may be associated with a rule that states that the flight can be rescheduled as long as the arrival time is within, e.g., 60 minutes of the booked flight. Additionally, the rule may state that the traveler is willing to travel from or to a variety of airports (in a city with multiple airports, such as New York). Thereafter, each flight itinerary of that traveler may be associated with the traveler's rules. In the alternative, each traveler may be associated with a rule set by their employer. Another alternative allows each itinerary to have a set of rules that is set at the time that arrangements are established. Several of the above examples may be combined with each other. For example, a traveler may have a personal set of rules as well as rules set by his employer. In another embodiment, a traveler may have a general set of rules, but may be able to augment or change those rules at the time of placing each specific flight.

One method of associating rules with a traveler is to use an extension of the typical "member profile." A traveler typically completes a member profile in which he indicates his preference for, e.g., a window seat or an aisle seat. Such a profile may be extended to include information as to the traveler's rules. In addition, an organization may have an organization profile which indicates, e.g., a policy which does not allow First Class travel. The organization profile may be extended to contain rules which are associated with the organization as a whole. Rules will be discussed more fully infra.

With reference to FIG. 1, an exemplary flowchart illustrating an overview of the operation of a system of the present invention is presented. In general, the system scans a database which contains a plurality of travel itineraries (step 102). In scanning the database, the system determines itineraries which can be grouped together (step 104). In forming the group, the system also takes into consideration the rules established either by the traveler or by his employer. Once a group of similar itineraries has been formed, the group of itineraries can be presented to various suppliers (step 106). If a supplier wishes to book the group, the supplier may place a bid on a particular group (step 108). The system then determines which bid is the optimum acceptable bid (step 110). To be an acceptable bid, the bid should meet the criteria set forth in the rules associated with the itineraries. For example, if the rule states that the itinerary should not be changed if the resulting itinerary results in an arrival time that is more than an hour later than the booked flight, than any bid which results in an arrival time greater than an hour is not acceptable. The optimum acceptable bid is then selected and each itinerary in the selected group will be booked by the supplier which won the bid (step 112).

Figure 2:
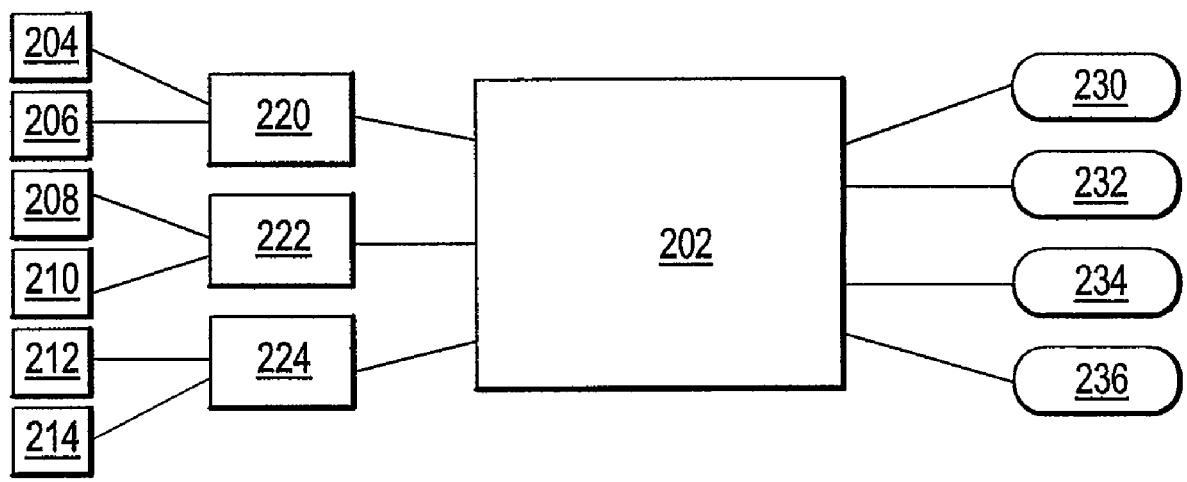
FIG. 2 depicts a system in which an embodiment of the present invention operates.

With reference to FIG. 2, a diagram depicting an exemplary system of the present invention is shown. Elements 204, 206, 208, 210, 212, and 214 represent consumers seeking to travel. It should be understood that the number of consumers is not limited to the number shown in FIG. 2, as thousands or more consumes may be linked to a system of the present invention. It should also be understood that the consumers may or may not be part of a larger organization. The reservations made by the consumers are stored in various Global Distribution Systems 220, 222, and 224. The reservations may be made through the use of an intermediary, such as a travel agent. Again, it should be understood that the number of Global Distribution Systems is not limited to that shown in FIG. 2. A system 202 is coupled to the various Global Distribution Systems 220, 222, and 224. System 202 is a computer system with the capability to access various database systems such as Global Distribution Systems 220, 222, and 224. System 202 also has the capability to process data and organize the data into the above-described groups. System 202 is coupled to various providers, such as airlines 230, 232, 234, and 236. System 202 is configured to provide data to airlines 230, 232, 234, and 236 in a format readable to them.

The operation of an exemplary embodiment of the present invention will now be examined in further detail. A system 202 containing an embodiment of the present invention is configured to interact with travel reservation databases that contain travel itineraries that are booked, but not yet ticketed. In an exemplary embodiment, one or more than one travel reservation database may be scanned. For example, a GDS database may be examined in addition to the database of an online travel agent.

In an exemplary embodiment, system 202 scans the databases and fields to find similar itineraries. There may be a variety of different criteria used to determine if itineraries are similar, such as, for example, if they are identical, i.e., the itineraries have the same date and time with the same arrival and departure locations. In the alternative, itineraries may be similar even if they have different arrival and departure times that are within a predetermined time frame. For example, itineraries with arrival or departure times within a given time period (e.g., departures between noon and 1 p.m.) may be considered similar. If the associated rules allow a change in arrival or departure airport, itineraries can be considered similar as long as the airports are within a predetermined proximity with each other. For example, a departure from New York's La Guardia Airport may be considered similar to a departure from New York's JFK International Airport, if both departures allow the changing of airports. Similar itineraries also typically have a set of rules that are nearly identical for each itinerary in the group. For example, an itinerary that is associated with a rule stating that airport changes are not allowable may not be grouped with itineraries that do allow changes to the airport.

In a further embodiment of the present invention, itineraries may be part of several different groups. For example, if a particular itinerary has a departure time of 12:00 noon, but its associated rule states that the traveler is flexible with respect to departure time and is willing to travel anytime within a 2 hour window before and after the scheduled time, the itinerary may be placed in groups with flights at 10:00 am, 11:00 am, 12:00 noon, 1:00 pm, and 2:00 pm.

Once similar itineraries are grouped by system 202 containing an embodiment of the present invention, the groups along with a description of the criteria of the groups are made available for bidding by various airlines. The airlines are given a predetermined amount of time to make a bid on each of the available groups. The predetermined amount of time may be different for different groups. For example, one possible rule is that the traveler may wish to be notified, e.g., 3 days before the departure of any change in the flight plan. However, another traveler may only desire 24 hour notification of any change. The airline preferably provides bids in sufficient time to notify the travelers.

The actual placing and accepting of bids may be performed in a variety of different methods known in the art. For example, an Internet interface may be used to both display the groups and to accept bids on the group. In the alternative, bids may be accepted, inter alia, by telephone or by mail. Other examples of bidding systems are found in U.S. Pat. No. 4,799, 156 "Interactive Market Management System" owned by Strategic Processing Corporation and U.S. Pat. No. 5,797,127 "Method, Apparatus, And Program For Pricing, Selling, And Exercising Options To Purchase Airline Tickets" owned by Walker Asset Management, the entire contents of which are hereby incorporated by reference. The bidding may be blind in that one airline does not know whether other airlines are making bids and what the other airlines are charging. In the alternative, the bidding may be open such that the airlines know what the top bid is, although the identity of each particular bidder may remain unknown to the participating airlines. In the alternative, a "preferred" provider may, for valuable consideration, be given the opportunity to view the bids of its competitors in order to give the provider an advantage in making its bid.

Once the predetermined time period has expired, a system of the present invention will examine the submitted bids to determine the optimum bid. There may be a variety of standards used to determine an optimum bid, such as, for example, whether the bid conforms to the rules set forth for the group of itineraries. Moreover, for example, if each of the group of itineraries are associated with a rule stating that the flight must arrive by 7 PM, a bid of a flight which arrives past 7 PM may not be acceptable.

In the alternative, a determination of the acceptability of a bid may also occur at the time the bid is entered. In this manner, an airline is given immediate notification when a non-acceptable bid is entered such that the airline is able to submit an acceptable bid. For example, if the above-described Internet interface is used, an airline may receive immediate notification when a submitted bid is not acceptable through common database and display techniques. In addition to determining whether bids are acceptable, a system of an exemplary embodiment of the present invention will determine which bid is optimum. This may be accomplished via a variety of different methods. For example, the optimum bid could be selected by determining which bid presents the greatest savings to the consumers. In the alternative, the optimum bid could be selected in a variety of different methods. For example, an airline may be a "preferred" provider, as described above. In such a situation, a bid from the preferred provider may be selected even if it is not the lowest bid, as long as various criteria are met (e.g., the price is within 5 or 10% of the lowest bid).

In the alternative, the system of rules may be configured such that cost is not the primary factor. For example, if a traveler set up a reservation at 12:00 noon, he may state that he would change to 11:00 if the savings were 20%, but would only switch to 10:00 if the savings were 35%. Therefore, a bid with a 30% savings for a 10:00 departure may lose to a bid with only a 20% savings but an 11:00 departure even though the 10:00 departure actually results in a greater savings.

After the winning bid has been determined, the travelers are notified as to the change in their plans, so that they can proceed to the correct airport and gate. Such a notification may occur in many ways. For automation purposes, the fastest method may involve sending an e-mail message, phone call, voice mail, fax or page to the affected traveler. In the alternative, a live person may make the calls or faxes and verbally inform the traveler as to the change.

An exemplary situation illustrating the operation of an exemplary embodiment of the present invention is as follows. The booked, but unticketed flights for a particular time period are accessed by a system of the current invention. It is determined that there are 10 travelers booked to leave New York's La Guardia Airport to Chicago's O'Hare Airport between 8 am and 9 am, non-stop that have a similar set of associated rules. The average ticket price for this segment is $600. Each of the 10 travelers have a similar set of rules, e.g., the rules may state that, in order to change flights, savings must be more than $99; increased travel time must be less than 30 minutes; the arrival time must be within 30 minutes of the original, booked arrival time; and the use of alternate airports is approved. The flights are booked on three different carriers: four itineraries are booked on X, two are booked on Y, and three are booked on Z. Each of the three carriers are informed of the situation and the carriers are given the opportunity make a determination of whether or not they wish to make an bid for the group of itineraries. For example, carrier X may offer $90 off for each member of the group; carrier Y may offer $200 off for each member, but with a flight out of the Newark airport; and carrier Z may offer $130 off for each member. The system determines that the offer of carrier X is not acceptable because it does not offer enough savings and also determines that the offer of carrier Y offers the most savings to the travelers. The above-described process may be transparent to the travelers: the travelers will merely be notified that an itinerary similar to their booked itinerary, but within their preset rules, has been booked. The carriers are each informed of the available travelers and, in effect, bid for the business of the travelers.

There are several advantages of the present invention over the prior art. For example, the system of the present invention is substantially non-invasive and interaction with the traveler is minimized. In other words, travelers simply book travel through known procedures and the present system operates in the background and conducts an auction on the travelers' behalf. Another advantage is that the travelers in a group need not be in the same organization. In the past, a travel coordinator for an organization may wish to book, for example, ten travelers together in order to obtain a group discount. A similar effect happens in the previously described case. However, in the present case, the travelers need not be aware of each other, as the similar flights were chosen and bid upon without necessarily the intervention by the travelers. Thus, companies which previously did not have the volume to obtain a discount are able to do so with a system of the present invention. Other advantages include the following: 1) the corporations do not need to know with whom they are "partnering" as the system brokers the auction population; 2) deals are being negotiated off of actual demand—units of actual individual reservations as opposed to forecasted annual demand; 3) buyers do not need to change their pattern of behavior until after a deal has been negotiated; and 4) pricing is dynamic (being determined on an ongoing basis in real-time).

No element described in this specification is necessary for the practice of the invention unless expressly described herein as "essential" or "required." The above description presents exemplary modes contemplated in carrying out the invention. The techniques described above are, however, susceptible to modifications and alternate constructions from the embodiments shown above. Consequently, it is not the intention to limit the invention to the particular embodiments disclosed. On the contrary, the invention is intended to cover all modifications and alternate constructions falling within the scope of the invention, as expressed in the following claims when read in light of the description and drawings.

For example, while the specification discussed airline reservations in detail, the present invention can be adapted to operate on a variety of goods and services. For example, a traveler will typically make hotel and car rental reservations at the same time as airline reservations. It is thus possible to extend the present invention to encompass both the hotel and car rental contexts. In addition, the present invention may be extended to almost any type of goods or services. The present invention is especially useful in a situation in which a consumer indicates his desire to purchase a certain product or service and has flexibility as to the exact product or service being purchased. For example, a consumer may indicate his desire for a CD player in a certain price range, but be flexible as to the brand or certain features of the player (e.g., single-disc or changer). A merchant may wish to capture this consumer's desire for a CD player and submit the bid to several organizations which may wish to bid upon the provision of the CD player.

Moreover, the present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, or the like, with the various algorithms being implemented with any combination of data structures, objects, processes, routines or other programming elements. Further, it should be noted that the present invention may employ any number of conventional techniques for data transmission, signaling, data processing, network control, and the like. For a basic introduction of cryptography, please review a text written by Bruce Schneider which is entitled "Applied Cryptography: Protocols, Algorithms, And Source Code In C," published by John Wiley & Sons (second edition, 1996), which is hereby incorporated by reference.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

It will be appreciated, that many applications of the present invention could be formulated. One skilled in the art will appreciate that the network may include any system for exchanging data or transacting business, such as the Internet, an intranet, an extranet, WAN, LAN, satellite communications, and/or the like. The users may interact with the system via any input device such as a keyboard, mouse, kiosk, personal digital assistant, handheld computer (e.g., Palm Pilot®), cellular phone and/or the like. Similarly, the invention could be used in conjunction with any type of personal computer, network computer, workstation, minicomputer, mainframe, or the like running any operating system such as any version of Windows, Windows NT, Windows2000, Windows 98, Windows 95, MacOS, OS/2, BeOS, Linux, UNIX, or the like. Moreover, although the invention is frequently described herein as being implemented with TCP/IP communications protocols, it will be readily understood that the invention could also be implemented using IPX, Appletalk, IP-6, NetBIOS, OSI or any number of existing or future protocols. Moreover, the system contemplates the use, sale or distribution of any goods, services or information over any network having similar functionality described herein.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

Communication between the parties to the transaction and the system of the present invention is accomplished through any suitable communication means, such as, for example, a telephone network, Intranet, Internet, point of interaction device (point of sale device, personal digital assistant, cellular phone, kiosk, etc.), online communications, off-line communications, wireless communications, and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

The present invention is described herein with reference to block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

The computing units may be connected with each other via a data communication network. The network may be a public network and assumed to be insecure and open to eavesdroppers. In the illustrated implementation, the network may be embodied as the internet. In this context, the computers may or may not be connected to the internet at all times. For instance, the customer computer may employ a modem to occasionally connect to the internet, whereas the bank computing center might maintain a permanent connection to the internet. It is noted that the network may be implemented as other types of networks, such as an interactive television (ITV) network.

We claim:

1. A method comprising:
    determining, by an automated programmed computer system for accepting a bid for a travel service, that a first itinerary of a first consumer and a second itinerary of a second consumer match within a predefined threshold defined within first consumer rules, first organization rules, second consumer rules, and second organization rules;
    grouping, by said computer system, said first itinerary and said second itinerary to create a subset of consumer itineraries with reservations that are booked but not ticketed;
    providing by said computer system, said subset of consumer itineraries to a vendor offering said travel service;
    accepting, by said computer system, said bid from said vendor to provide said travel service to said first consumer and said second consumer based on an ability of said vendor to provide said travel service within said predefined threshold defined within said first consumer rules, said first organization rules, said second consumer rules, and said second organization rules;
    wherein said first consumer rules relate to at least one of: first consumer departure time, first consumer arrival time, first consumer airport pair, first consumer class, and first consumer seating;
    wherein said first organization rules relate to at least one of: first organization departure time, first organization arrival time, first organization airport pair, first organization class, and first organization seating;
    wherein said second consumer rules relate to at least one of: second consumer departure time, second consumer arrival time, second consumer airport pair, second consumer class, and second consumer seating;
    wherein said second organization rules relate to at least one of: second organization departure time, second organization arrival time, second organization airport pair, second organization class, and second organization seating;
    verifying, by said computer system, that said bid is in accordance with said predefined threshold defined within said first consumer rules, said first organization rules, said second consumer rules, and said second organization rules;
    confirming, by said computer system, that said bid is an optimum bid; and
    modifying, by said computer system, a second subset of said subset of consumer itineraries to include said travel arrangements with a second different vendor according to said bid, wherein said second subset of consumer itineraries does not include said second different vendor.

2. The method of claim 1, wherein said second different vendor more closely matches at least one of: said first consumer rules, said second consumer rules, said first organization rules, and said second organization rules.

3. The method of claim 1, wherein said second subset of said plurality of itineraries of said subset of consumer itineraries is not modified when said second different vendor does not provide said optimum bid.

4. The method of claim 1, further comprising notifying at least one of: said first consumer and said second consumer of said optimum bid.

5. The method of claim 1, wherein said confirming step comprises determining when said bid provides optimum savings for at least one of: said first consumer and said second consumer.

6. The method of claim 1, further comprising:
    compiling a first user profile based on said first consumer rules defined by a first consumer;
    compiling a first organization profile based on said first organization rules defined by a first organization;
    compiling a second user profile based on said second consumer rules defined by a second consumer; and
    compiling a second organization profile based on said second organization rules defined by a second organization.

7. The method of claim 6, further comprising:
    establishing a network connection with a plurality of Customer Reservations Systems, wherein one of said plurality of Customer Reservations Systems was used to book travel reservations to create one of a plurality of consumer itineraries;

analyzing said plurality of consumer itineraries stored at said plurality of Customer Reservations Systems to identify similar itineraries, wherein said similar itineraries include a similar departure time, similar arrival time, similar airport pair, similar class, and similar seating, and wherein said similar itineraries comprise reserved travel arrangements with a first vendor;

retrieving said first user profile and said first organization profile corresponding to a first itinerary, wherein said first itinerary is one of said similar itineraries;

retrieving said first user profile and said first organization profile corresponding to a second itinerary, wherein said second itinerary is one of said similar itineraries;

comparing said first consumer rules and said first organization rules relating to said first itinerary to said second consumer rules and said second organization rules relating to said second itinerary to determine when said first itinerary and said second itinerary match within a predefined threshold defined within said first consumer rules, said first organization rules, said second consumer rules, and said second organization rules; and grouping said first itinerary and said second itinerary to create said subset of consumer itineraries.

8. The method of claim 7, wherein said reserved travel arrangements comprise at least one of contractually obligated and booked travel reservations.

9. The method of claim 7, wherein said retrieving step comprises scanning said travel reservations database to determine rows of said consumer information with a similar at least one of said first consumer rules, second consumer rules, said first organization rules, and said second organization rules, placing said rows of a similar at least one of said first consumer rules, second consumer rules, said first organization rules, and said second organization rules into said subset of said consumer itineraries, wherein said travel reservations database comprises a plurality of rows.

10. The method of claim 9, wherein an individual row of said rows is placed into a plurality of said subset of said consumer itineraries.

11. The method of claim 9, wherein said rows are similar when at least one of said first consumer rules, said second consumer rules, said first organization rules, and said second organization rules differ by less than a predetermined criteria.

12. The method of claim 1, wherein said verifying step comprises evaluating said bid based on a proposed price and a proposed provision of said travel service.

13. The method of claim 1, further comprising storing a deviation to said first consumer rules and said second consumer rules.

14. The method of claim 1, further comprising storing a restriction upon a deviation from at least one of: said first consumer rules, said second consumer rules, said first organization rules, and said second organization rules.

15. The method of claim 1, wherein said travel service comprises at least one of an airline reservation, automobile rental reservation, and hotel reservation.

16. The method of claim 1, wherein said first consumer rules and said second consumer rules include at least two of price, scheduling preferences, departure airport, destination airport, departure date, departure time, arrival data, arrival time, seating preferences, and special accommodations.

17. The method of claim 1, wherein said first organization rules and said second organization rules include restrictions relating to at least two of price, scheduling preferences, departure airport, destination airport, departure date, departure time, arrival data, arrival time, seating preferences, and special accommodations.

18. A non-transitory, tangible computer-readable medium having stored thereon a plurality of instructions, when executed by an automated programmed computer system for accepting a bid for a travel service, said plurality of instructions cause said computer system to perform operations comprising:

determining, by said computer system, that a first itinerary of a first consumer and a second itinerary of a second consumer match within a predefined threshold defined within first consumer rules, first organization rules, second consumer rules, and second organization rules;

grouping, by said computer system, said first itinerary and said second itinerary to create a subset of consumer itineraries with reservations that are booked but not ticketed;

providing, by said computer system, said subset of consumer itineraries to a vendor offering said travel service;

accepting, by said computer system, said bid from said vendor to provide said travel service to said first consumer and said second consumer based on an ability of said vendor to provide said travel service within said predefined threshold defined within said first consumer rules, said first organization rules, said second consumer rules, and said second organization rules;

wherein said first consumer rules relate to at least one of: first consumer departure time, first consumer arrival time, first consumer airport pair, first consumer class, and first consumer seating;

wherein said first organization rules relate to at least one of: first organization departure time, first organization arrival time, first organization airport pair, first organization class, and first organization seating;

wherein said second consumer rules relate to at least one of: second consumer departure time, second consumer arrival time, second consumer airport pair, second consumer class, and second consumer seating;

wherein said second organization rules relate to at least one of: second organization departure time, second organization arrival time, second organization airport pair, second organization class, and second organization seating;

verifying, by said computer system, that said bid is in accordance with said predefined threshold defined within said first consumer rules, said first organization rules, said second consumer rules, and said second organization rules;

confirming, by said computer system, that said bid is an optimum bid; and modifying, by said computer system, a second subset of said subset of consumer itineraries to include said travel arrangements with a second different vendor according to said bid, wherein said second subset of consumer itineraries does not include said second different vendor.

19. A method comprising:

submitting, by an automated programmed computer system for providing a bid for a travel service, said bid to provide said travel service to a first consumer and a second consumer based on a subset of consumer itineraries and an ability to provide said travel service within a predefined threshold defined within first consumer rules, first organization rules, second consumer rules, and second organization rules;

wherein a first itinerary of said first consumer and a second itinerary of said second consumer match within a predefined threshold defined within said first consumer rules, said first organization rules, said second consumer rules, and said second organization rules;

wherein said first itinerary and said second itinerary are grouped to create said subset of consumer itineraries with reservations that are booked but not ticketed;

wherein said first consumer rules relate to at least one of: first consumer departure time, first consumer arrival time, first consumer airport pair, first consumer class, and first consumer seating;

wherein said first organization rules relate to at least one of: first organization departure time, first organization arrival time, first organization airport pair, first organization class, and first organization seating;

wherein said second consumer rules relate to at least one of: second consumer departure time, second consumer arrival time, second consumer airport pair, second consumer class, and second consumer seating;

wherein said second organization rules relate to at least one of: second organization departure time, second organization arrival time, second organization airport pair, second organization class, and second organization seating;

receiving, by said computer system, verification that said bid is in accordance with said predefined threshold defined within said first consumer rules, said first organization rules, said second consumer rules, and said second organization rules;

confirming, by said computer system, that said bid is an optimum bid; and modifying, by said computer system, a second subset of said subset of consumer itineraries to include said travel arrangements with a second different vendor according to said bid, wherein said second subset of consumer itineraries does not include said second different vendor.

* * * * *